United States Patent [19]

Brokman et al.

[11] Patent Number: 5,185,218
[45] Date of Patent: Feb. 9, 1993

[54] ELECTRODES FOR METAL/AIR BATTERIES AND FUEL CELLS AND METAL/AIR BATTERIES INCORPORATING THE SAME

[75] Inventors: Avner Brokman; Jonathan Goldstein, both of Jerusalem, Israel

[73] Assignee: Luz Electric Fuel Israel Ltd, Jerusalem, Israel

[21] Appl. No.: 633,519

[22] Filed: Dec. 31, 1990

[51] Int. Cl.⁵ ............................................. H01M 8/06
[52] U.S. Cl. ....................................... 429/27; 429/15; 429/41; 429/42; 429/71; 429/81; 429/105; 429/118; 429/210; 204/284
[58] Field of Search .................... 204/284; 429/15, 27, 429/41, 42, 71, 81, 105, 118, 210

[56] References Cited

U.S. PATENT DOCUMENTS

| | | | |
|---|---|---|---|
| 3,549,422 | 12/1970 | Wagner | 429/28 |
| 4,246,324 | 1/1981 | deNora et al. | 429/27 |
| 4,341,847 | 7/1982 | Sammells | 429/27 |
| 4,463,064 | 7/1984 | Ruch et al. | 429/27 |
| 4,565,749 | 1/1986 | van Ommering et al. | 429/27 |
| 4,585,710 | 4/1986 | McEvoy | 429/27 |
| 4,842,963 | 6/1989 | Ross, Jr. | 429/27 |
| 4,908,281 | 3/1990 | O'Callaghan | 429/27 |
| 4,925,744 | 5/1990 | Niksa et al. | 429/27 |
| 4,950,561 | 8/1990 | Niksa et al. | 427/27 |
| 4,957,826 | 9/1990 | Cheilly | 429/27 |

Primary Examiner—Karl Group
Assistant Examiner—Anthony J. Green
Attorney, Agent, or Firm—Jacobson, Price, Holman & Stern

[57] ABSTRACT

The invention provides an air cathode in combination with an oxygen-rich electrolyte-immiscible organic fluid for supplying oxygen thereto, as well as providing metal/air batteries and hydrogen-oxygen fuel cells incorporating the same.

12 Claims, 4 Drawing Sheets

ELECTRODES FOR METAL/AIR BATTERIES AND FUEL CELLS AND METAL/AIR BATTERIES INCORPORATING THE SAME

The present invention relates to air cathodes for metal/air batteries and fuel cells, as well as to metal/air batteries incorporating the same.

Metal/air batteries of monopolar and bipolar design, both rechargeable and primary, are known in the art as described, e.g., in U.S. Pat. Nos. 3,549,422; 4,246,324; 4,341,847; 4,463,064; 4,565,749; 4,585,710; 4,908,281; 4,925,744 and 4,957,826.

As is known and described, e.g., in U.S. Patent 4,908,281, metal/air batteries produce electricity by the electrochemical coupling of a reactive metallic anode to an air cathode through a suitable electrolyte in a cell. The air cathode is typically a sheet-like member, having opposite surfaces respectively exposed to the atmosphere and to the aqueous electrolyte of the cell. During cell operation, oxygen is reduced within the cathode while metal of the anode is oxidized, providing a usable electric current flow through external circuitry connected between the anode and cathode. The air cathode must be permeable to air but substantially impermeable to aqueous electrolyte, and must incorporate an electrically conductive element to which the external circuitry can be connected. Present-day commercial air cathodes are commonly constituted of active carbon (with or without an added oxygen-reduction catalyst) in association with a finely divided hydrophobic polymeric material and incorporating a metal screen as the conductive element. A variety of anode metals have been used or proposed; among them, zinc, iron, lithium, aluminum, or alloys thereof are considered especially advantageous for particular applications, owing to their low cost, light weight, and ability to function as anodes in metal/air batteries using a variety of electrolytes.

A typical aluminum/air cell comprises a body of aqueous electrolyte, a sheet-like air cathode having one surface exposed to the electrolyte and the other surface exposed to air, and an aluminum alloy anode member (e.g., a flat plate) immersed in the electrolyte in facing spaced relation to the first-mentioned cathode surface.

Aqueous electrolytes for metal/air batteries consist of two major types, namely, a neutral-pH electrolyte and a highly alkaline electrolyte. The neutral-pH electrolyte usually contains halide salts and, because of its relatively low electrical conductivity and the virtual insolubility of aluminum therein, is used for relatively low power applications. The highly alkaline electrolyte usually consists of NaOH or KOH solution, and yields a higher cell voltage than the neutral electrolyte.

As is known, the air-cathode of prior art metal/air batteries and/or fuel cells has been exposed to the atmosphere and/or to an oxygen-containing gaseous stream.

According to the present invention, it has now been surprisingly found that major advantages can be obtained by supplying oxygen to an air-cathode via an organic fluid having a high oxygen concentration rather than via a gaseous medium, as heretofore taught and suggested by the prior art.

Thus, according to the present invention there is now provided an air cathode in combination with an oxygen-rich electrolyte-immiscible organic fluid for supplying oxygen thereto.

The term "oxygen-rich organic fluid" as used herein relates to any such fluid having an ability to retain at least 15% oxygen, i.e., a fluid capable of carrying at least 15 ml oxygen/100 ml fluid.

Fluids having a high affinity for oxygen and which readily facilitate the diffusion of oxygen in and out of said fluid, in an order of at least 30 ml oxygen/100 ml fluid, are especially preferred.

It is also to be noted that the term "organic fluid" as used herein includes viscous fluids which can be smeared on the cathode structure and which enable oxygen diffusion therethrough, while serving as a supplementary hydrophobic layer.

The fluid could be an oil such as a fluorinated hydrocarbon with high oxygen solubility or an oil or fluid containing a dissolved oxygen trapping compound such as a macrocyclic. Other non-halogenated oils suitable for use include silicone oils, such as Dow Corning 200; high-boiling mineral oils and hydrocarbons, such as decane, $C_{10}H_{24}$.

Especially preferred for use in the present invention are perfluorocarbon compounds, because of their especially high affinity for oxygen; however, other oxygen-rich organic fluids such as the aforementioned silicone oils, mineral oils, hydrocarbons and fluorinated hydrocarbons may alternatively be preferred for economic reasons.

The perfluorocarbon compounds are dense liquids of a low surface tension, immiscible with water and are noted for their ability to dissolve about 40% of oxygen at 37° C. and at atmospheric pressure (water dissolves only 2.3% oxygen by volume). These compounds are considered as oxygen carriers and releasing agents, thus serving as temporary substitutes for blood in severe cases of hemorrhage or ischemia. The chemistry and properties of perfluorinated liquids are summarized in *Federation Proceedings*, Vol. 29, No. 5, September–October 1970. To the best of our knowledge, no attempts have been made, however, to use such fluids as vehicles for delivering oxygen to a metal/air battery.

Suitable perfluorocarbon compounds for use in the present invention include perfluorotripropylamine cis- and trans-perfluorodecalin, perfluoroisopentyltetrahydropyrane, perfluoro-N,N-dimethylcyclohexylamine, perfluoro-1-methyl decalin, perfluoroperhydrophenanthrene and perfluorotributylamine.

Preferably said perfluorocarbon compound is selected from cis-perfluorodecalin, trans-perfluorodecalin, perfluoro-1-methyl decalin, perfluorotripropylamine and perfluoro-tributylamine.

As demonstrated in Example 1 hereinafter, oxygen supplied through a layer of fluorocarbon oil such as perfluorodecalin produces polarization results indicating activity for oxygen reduction at the air cathode similar to that achieved with a feed gas of air scrubbed free of $CO_2$.

A major advantage of using an oxygen-rich fluid is that it supplies rigidity and better pressure balance against the electrolyte. Furthermore, alkaline electrolytes such as KOH have a high vapor pressure and the presence of a liquid along a surface of the air cathode ameliorates the problem of water loss of KOH-based aqueous electrolyte, which exists in a gaseous air system.

In preferred embodiments of the present invention, said air cathode will be provided in combination with means for pumping said fluid to said cathode.

A preferred system comprises a first reservoir of fluid in combination with first pumping means for delivering oxygen-rich electrolyte-immiscible fluid to said cathode and returning oxygen-depleted fluid to said reservoir and second pumping means for delivering oxygen to said reservoir for the regeneration of the oxygen-rich fluid.

The air cathodes of the present invention are especially effective in metal/air batteries and hydrogen-oxygen fuel cells.

Thus, the present invention provides a metal/air battery comprising an air cathode in combination with an oxygen-rich electrolyte-immiscible organic fluid for supplying oxygen thereto.

Said metal/air battery can be a monopolar or bipolar primary metal/air battery of the type having a plurality of electrically connected cells, each of said cells comprising an air cathode in combination with an oxygen-rich electrolyte- immiscible organic fluid for supplying oxygen thereto.

The present invention also provides a hydrogen-oxygen fuel cell comprising an air cathode in combination with an oxygen-rich electrolyte-immiscible organic fluid for supplying oxygen thereto.

The air cathodes of the present invention preferably also incorporate features described and claimed in U.S. Pat. No. 07/633518 filed on even date herewith, in that said cathodes preferably also comprise a) a current-collecting metallic structure; and b) a metallic foamed or fiber mat having a first surface attached to a first surface of said structure, a second surface of said mat being impregnated with an inner hydrophobic waterproof barrier layer coated with an outer active catalytic layer.

In preferred embodiments of the present invention, there is provided a bipolar electrode for use in a primary metal/air battery of the type having a metallic slurry anode as described hereinafter, said electrode comprising:

a) current-collecting electrolyte-impervious metallic structure having a first surface for collecting current from said metallic slurry anode;

b) a metallic foamed or fiber mat having a first surface attached to a second surface of said structure, a second surface of said mat being impregnated with an inner hydrophobic waterproof barrier layer coated with an outer active catalytic layer, said mat constituting an air cathode, and c) means for pumping said oxygen-rich electrolyte-immiscible organic fluid through said mat.

The current-collecting structure is preferably chemically inert, both with respect to the electrolyte and the slurry, and is preferably made of nickel, silver, or nickel or silver plated steel, and use of a nickel foil for this purpose is especially preferred.

The term "metallic foamed or fiber mat" as used herein relates to a mat formed of foamed metal, metal fibers or metal-coated fibers, said metal being nickel or a valve metal such as titanium, tantalum, tungsten, zirconium, niobium, hafnium, vanadium, yttrium, or alloys thereof, with nickel being especially preferred.

Thus, preferably said mat is foamed nickel in which nickel metal forms the walls of the bubbles of the foamed structure or said mat is comprised of nickel fibers or nickel-coated fibers of a diameter of about 20 microns.

Also in the preferred embodiment of the present invention, said mat has a thickness of about 0.4 to about 2 millimeters and has a porosity of at least 75% and preferably of at least 90%.

For these embodiments, mats having a porosity of at least 95% are preferred, since such mats facilitate the pumping of the fluid therethrough with minimal resistance.

The presently proposed battery system is appreciably advantageous over prior art batteries, inter alia, in light of the facts that:

a) Using a fluid of a type which is immiscible with an alkaline electrolyte, prevents the evaporation of water vapor by acting as an additional hydrophobic barrier.

b) By pumping fluid through the air electrode, the problem of thermal balance in the cells could be more easily controlled.

c) By varying the pumping rate of fluid through the air gaps in the mat, the amount of pure $O_2$ available to the air electrode current collector changes. Thus, an increased pumping rate gives increased EV battery power for acceleration.

d) Since there are no air gaps in the stack, the battery is characterized by improved robustness.

As stated, the outer surface of said mat is impregnated with an active catalytic layer as is known per se in the art, using a catalyst such as the platinum group metals, including a platinum black; platinum group metal oxides; platinum activated carbon; silver (e.g., Raney silver); macrocyclics, such as cobalt macrocyclic or cobalt pthalocyanine, or other catalytic metal oxides such as perovskites, delafossites, bronzes or spinel-type oxides.

Beneath said active catalytic layer, there is provided a hydrophobic waterproof barrier layer of the type also known per se in the art, using, e.g., a lipophobic (e.g., hydrophobic) resin such as PTFE, polyethylene, polychlorofluoroethylene, various vinyl resins, and the like, in such a way as to let the resin penetrate inside the pores for a certain depth from the surface. The resin forms a waterproof barrier beneath the second surface of the mat and imparts hydrophobic properties thereto, thereby effectively preventing flooding of the mat by the electrolyte and facilitating the maintenance of the three-phase boundary layer with oxygen and electrolytes in the catalytic layer along the second surface of the mat which functions as an air cathode.

When the terminology "oxygen" is used in this disclosure and claims, it is understood that a wide number of gases containing substantial portions of oxygen, such as air, are satisfactory for use with the oxygen diffusion cathodes in the cells of this invention. The only requirement is that sufficient oxygen be supplied to the fluid for subsequent reduction at the cathode without associated gases reacting in an adverse manner with the electrodes or electrolyte.

The electrolyte envisioned for use in batteries incorporating the presently claimed air cathode may be any suitable alkaline aqueous electrolyte such as about 4 to 12 N potassium hydroxide or sodium hydroxide. In the embodiment of the invention utilizing chemically non-reactive anode surfaces, a slurry of anode-active metal particles is maintained in a static bed during use and hydraulically replaced after discharge. Suitable anode-active metal particles include zinc particles having a size in the order of 50–500 microns present in an amount by weight of zinc in the electrolyte, of about 30 to 70 percent of the weight of the electrolyte.

In operation, the zinc from the anode-active zinc particle slurry is converted to zincates, which are removed from the electrochemical cell in the electrolyte.

As stated, the air cathode of the present invention could also be used in a hydrogen-oxygen fuel cell. Thus, as will be realized, with only minor modification the bipolar electrode described hereinbefore can be adapted for use in a hydrogen-oxygen fuel cell.

Thus, the present invention also provides a bipolar electrode for use in a primary fuel cell battery comprising:

a) a current-collecting electrolyte-impervious metallic structure;

b) a first mat of nickel foam, nickel fibers or nickel-coated fibers having a first surface attached to a first surface of said structure, a second surface of said mat being impregnated with an inner hydrophobic waterproof barrier layer coated with an outer active catalytic layer, catalytic for oxygen reduction, said mat constituting a cathode;

c) a second mat of nickel foam, nickel fibers or nickel-coated fibers having a first surface attached to a second surface of said structure, a second surface of said mat being impregnated with an inner hydrophobic waterproof barrier layer coated with an outer active catalytic layer, catalytic for hydrogen oxidation, said mat constituting an anode;

d) means for pumping said oxygen-rich electrolyte-immiscible organic fluid through said first mat, and e) means for pumping hydrogen through said second mat.

The invention will now be described in connection with certain preferred embodiments, with reference to the following illustrative examples and attached figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

EXAMPLE 1

Figure 1:
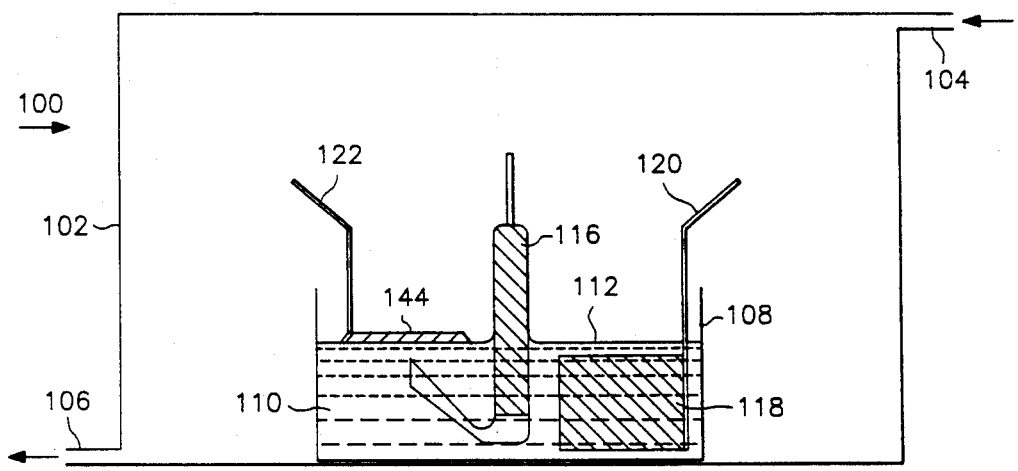
FIG. 1 is a cross-sectional front view of an electrochemical test-cell.

An electrochemical test cell 100, as illustrated in FIG. 1, was prepared to demonstrate the adaptability of the present invention to standard air cathodes.

Inside a sealed container 102 having an air inlet 104 and an air outlet 106, there was placed a vessel 108 into which was introduced as electrolyte 110 a 7 molar potassium hydroxide solution at 25° C. On the surface 112 of said electrolyte, there was placed a commercially available air/oxygen reduction electrode 114 (Electromedia Corporation, New Jersey, electrode type AE-20) to test for activity for oxygen reduction in the electrochemical half-cell.

A mercury/mercury oxide reference electrode 116 with Luggin capillary was introduced into the electrolyte to show the potential of the air cathode alone without a battery-type anode. A large area nickel counter electrode 118 was also introduced into the electrolyte to complete the electrical circuit, nickel leads 120, 122 being attached to said counter electrode 118 and said air electrode 114 respectively, to lead to a power supply (not shown).

The feed gas was air (scrubbed free of carbon dioxide) and the active area of the air electrode 114 exposed to the air/electrolyte interface was 6.6 cm$^2$.

The polarization results for 12-second pulse intervals are shown in Table 1, showing the excellent power producing characteristics of the gas diffusion electrode.

TABLE 1

| Air Electrode Polarization Results | | |
|---|---|---|
| | Overpotential (Inc. IR Drop) mV | |
| Current Density (mA/cm$^2$) | Air Supplied Via Gas Phase | Air Supplied Via Oil Phase |
| 50 | 108 | 110 |
| 100 | 150 | 160 |
| 200 | 234 | 250 |

The experiment was repeated with a 6.5 cm$^2$ piece of air electrode whose air-side had been completely impregnated with a fluorocarbon oil, perfluorodecalin ($_{10}F_{24}$).

This halogen-based compound was chosen for its inertness and low immiscibility with alkali, its high solubility for oxygen compared to alkali solutions, and low vapor pressure. The polarization results in Table 1 indicate similar activity for oxygen reduction at the air electrode, whether the oxygen is supplied via the gas phase or through a layer of oil with a high affinity for oxygen.

EXAMPLE 2

Using the set-up of Example 1, a number of non-halogenated oils with similar properties to perfluorodecalin (e.g., especially high oxygen solubility) were examined. The most promising were silicone oils, such as Dow Corning 200; high-boiling mineral oils and hydrocarbons, such as decane, $C_{10}H_{24}$. Similar polarization behaviors to that of Example 1 were obtained with runs of oil-free and oil-impregnated air electrodes.

EXAMPLE 3

Figure 2:
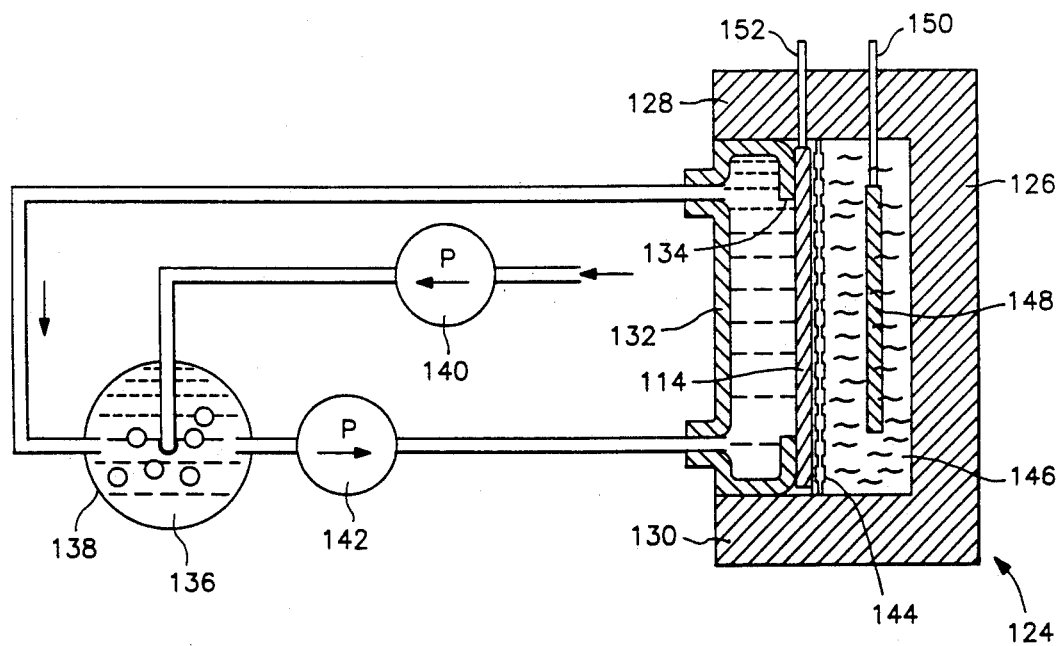
FIG. 2 is a cross-sectional top view of a zinc-air cell with a conventional air-electrode schematically linked with means for supplying oxygen via air-enriched fluid.

A modified test cell 124 was prepared as shown in FIG. 2, to allow a continuous stream of oxygen-rich fluid to be pumped over the air-side of the air electrode during polarization tests.

Thus a PVC cell container having a back wall 126, two side walls 128, 130 and a bottom (not shown) had its front opening filled with a hollow PVC chamber 132, the side and bottom walls of which were glued to the inner side walls 128, 130 and the bottom of said container. The chamber 132 was provided with a back open window 134 to which was glued the conventional air electrode 114 of Example 1.

A quantity of about 50 ml perfluorodecalin oil 136 in a container 138 was kept saturated with oxygen by bubbling carbon dioxide scrubbed air through the oil via an aquarium pump 140.

The oil 136 was pumped over the air electrode 114 and back into the container 138 (for resaturation with oxygen) with the aid of a peristaltic pump 142. A low pumping rate of 1 cc/min of oil was adequate for the small air electrode area of 6.6 $cm^2$. The electrolyte side of the air electrode was covered with a 0.25 mm thick porous polyamide separator 144, and there was a gap of approximately 4 mm to the back wall 126 of the cell.

A viscous slurry 146 was poured into this gap to act as a negative active material and electrolyte. The slurry was composed of zinc powder (50–500 microns, amalgamated with 4 wt % mercury), 50 wt %; potassium hydroxide solution (7 molar), 49.5 wt %; and gelling agent (polyacrylic acid) 0.5 wt % in the form of a homogeneous mixture. About 3.5 ml of slurry was required to fill the gap and cover the air electrode. The cell was completed by inserting a tabbed expanded mesh of 0.2 mm thick copper 148 into the slurry to act as a negative current collector, to which was attached cell negative tab 150. A cell positive tab 152 was attached to the air cathode 114.

Following wet-in of the cell, the aquarium pump 140 and peristaltic pump 142 were activated to supply oxygen-saturated oil to the air side of the air electrode of the cell. An open circuit voltage of 1.45 V was recorded. The cell was discharged at 325 mA constant current (50 mA/$cm^2$ with respect to the air electrode) at 25° C. It delivered about 1 Ahr at an average discharge voltage of 1.15 V until a final cutoff voltage of 1 V. Since the slurry contained about 1.75 gm zinc powder, the zinc utilization at this discharge rate was 68%.

Following discharge, the spent slurry was rinsed out with alkali and fresh slurry was poured in for the next discharge cycle, giving a similar performance.

EXAMPLE 4

Figure 3:
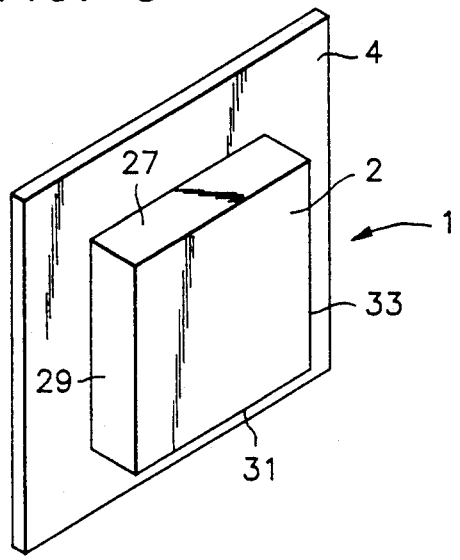
FIG. 3 is a perspective view of an electrode used in preferred embodiments of the present invention.
Figure 3A:
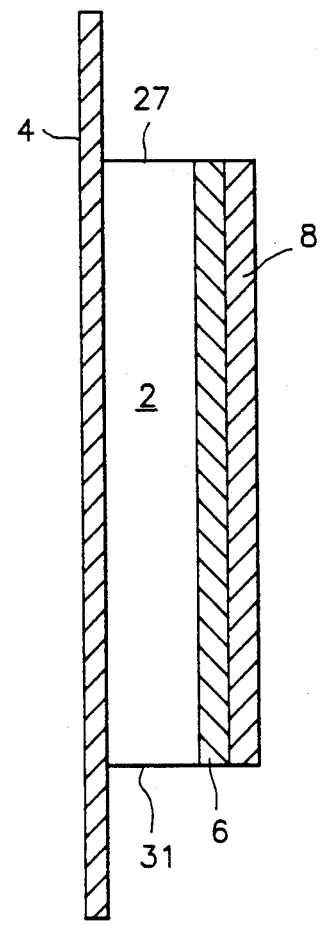
FIG. 3a is a cross-sectional view of the electrode of FIG. 3.

A piece of nickel mat 2 of a size of 71×71 mm, 2 mm thick and with a porosity of 90%, based on nickel fibers of a diameter of approximately 20 microns, was spot-welded at several points to a nickel foil 4 of a size of 79×79 mm, 0.2 mm thick, so that the foil projected beyond the mat by about 4 mm on each side (see FIG. 3). To an approximate depth of 0.5 mm, the outer surface of the mat was made both active for oxygen reduction and hydrophobic to electrolyte penetration by first pressing into the mat an inner layer 6 of 10 mg/$cm^2$, PTFE-bonded carbon as a blocking layer, as seen in FIG. 3a, followed by a mixture of PTFE powder and Raney silver catalyst (24 mg/$cm^2$, weight ratio PTFE to silver 1:5) as active layer 8. Pressing was conducted at room temperature in a mold at a pressure of 300 kg/$cm^2$.

Following pressing, the thus formed electrode 1 was sintered in an oven (340° C., 30 minutes).

The electrode 1 described above can be used as a basic bipolar electrode for a zinc-air battery, with the impregnated mat side functioning as the air cathode in each cell, and the nickel foil side functioning as the current collector for a metallic slurry anode adjacent thereto. For initial testing, the bipolar electrode was glued into a flat mounting plate 10 of the type illustrated in FIG. 4.

Said mounting plate 10 is formed or molded preferably as one piece from a material of construction which is non-reactive with chemicals present in the battery cell. Useful materials of construction include ceramics, as well as plastics including nylon, polypropylene, chlorinated polyvinyl chloride and polyphenylene oxide blends with polystyrene, and combinations of the foregoing.

Especially preferred is a mounting plate made of PVC, having a central cut-out area 12 sized to tightly fit around said mat 2 as described hereinafter.

A first edge 14 of said cut-out area 12 was provided with a plurality of fluid inlets 16 and the opposite edge 18 was provided with a plurality of fluid outlets 20.

Fluid inlets 16 were connected to and fed by a fluid inlet manifold 22 bored through the plane of said plate and leading to an edge 24 thereof, and fluid outlets 20 were similarly connected to a fluid outlet manifold 26, also bored through the plane of said plate and leading to the edge 24 thereof.

Figure 4:
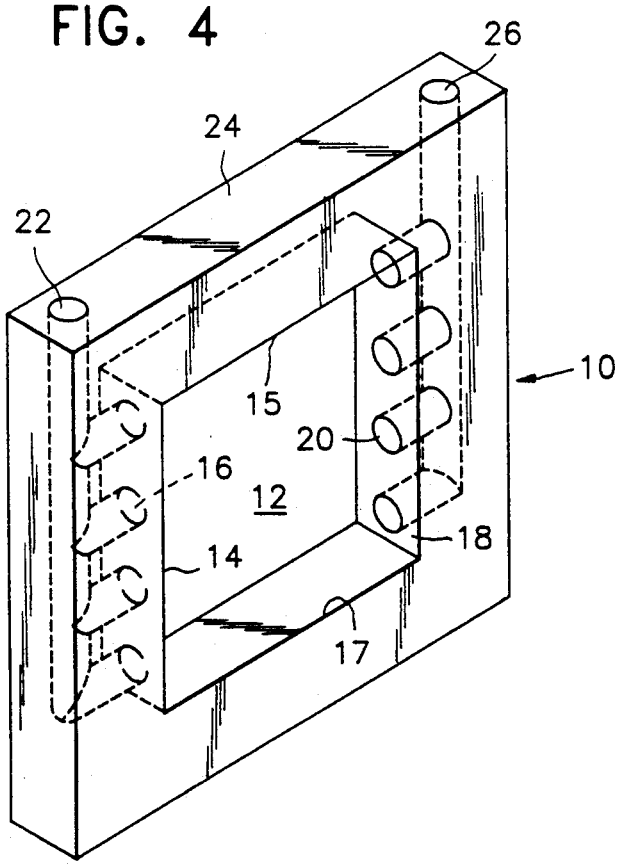
FIG. 4 is a perspective view of a supporting frame element for the electrode of FIG. 3.

Thus, as seen in FIG. 4, there is provided a PVC sheet of a size of 100 mm × 100 mm, 2 mm thick, having a central cut-out window 12 to accommodate the nickel mat 2 and a number of fluid inlet holes 16 and exit holes 20 drilled within the plane of the sheet, so that oxygen-enriched organic fluid could be supplied to and removed from the inner surface of the mat. The mat is inserted in said cut-out area 12, with the peripheral edges 27, 29, 31 and 33 being glued to the inner surfaces 14, 15, 17 and 18 of the cut-out area 12 of said mounting plate 10, e.g., with epoxy glue, which seals said edges and prevents any leakage of electrolyte into the mat 2 therefrom. A separator (not shown) can then be glued to the electrolyte-facing surface of said mat 2 and plate 10.

Figure 5:
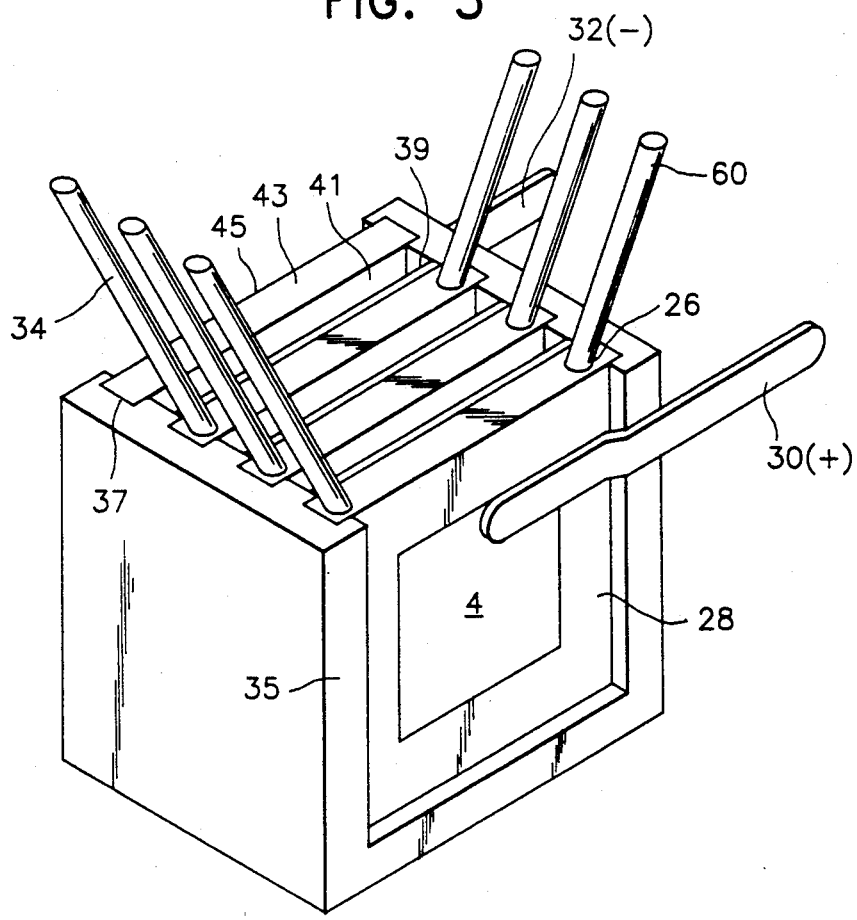
FIG. 5 is a perspective view of an assembled battery of the present invention in which the electrode of FIGS. 3 and 3a is arranged as a bipolar electrode.
Figure 6:
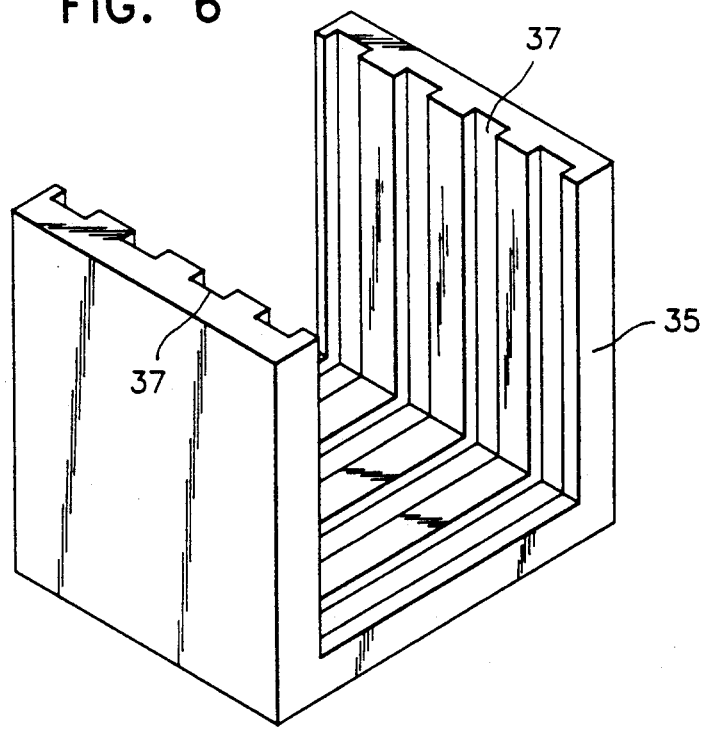
FIG. 6 is a perspective view of a battery container in which supported bipolar electrodes are insertable and removable.

A three-cell bipolar battery was constructed as shown in FIG. 5, by gluing three of the PVC-mounted bipolar electrodes 1 of FIG. 3, and a fourth plate-mounted electrode 43 comprising a PVC sheet and a nickel foil only (no mat), into a U-shaped PVC element 35, having walls of a thickness of 4 mm and provided with grooves 37 sized to receive and retain said plates 10 (see FIG. 6). Care was taken to ensure that in each cell the positive air electrode side faced the negative zinc current collector side of an adjacent electrode, and that the separation 41 between the polyamide separator surface 39 and the nickel foil was about 3 mm. The first plate-mounted electrode 28 in FIG. 5 (positive) was tabbed externally with a welded-on piece of nickel foil 30 of a size of 100 mm × 10 mm × 0.2 mm as shown, to form the positive pole of the three-cell battery, while the fourth plate-mounted electrode 43 in the battery (negative), having a cut-out window but no through-going holes leading thereto, and having only a metal foil glued to the outward facing surface 45 thereof across said window with said nickel foil (not shown), was fitted with a similar welded-on nickel tab 32 to form the negative pole. The battery was first leak-tested (overnight stand with potassium hydroxide solution).

Oxygen was supplied in dissolved form via an organic liquid 136. An organic liquid was chosen with an appreciably higher solubility for oxygen than aqueous solutions, also with inertness and immiscibility with respect to the alkaline electrolyte of the battery and with low vapour pressure, and the oil perfluorodecalin was found to be acceptable. A 50 ml portion of oil was maintained saturated with oxygen by continuous bubbling through of air from an aquarium pump. The oxygen-rich oil was then circulated through the mat portion of the three air electrode elements of the bipolar battery, using a peristaltic pump (not shown), at a rate of 10 cc/min, via inlet hoses 34 attached to inlet manifold 22 for delivering oxygen-rich electrolyte immiscible fluid to said mat from a reservoir, as shown in FIG. 2, and then returned for resaturation with oxygen in said reservoir via outlet hoses 60 attached to outlet manifold 26.

During discharge of electricity from the battery, the depolarizing gas such as oxygen or oxygen-containing gas diffuses from the carrier organic liquid and is contacted with the active layer 6 inside the mat 2, which is also in contact with the electrolyte passing through a porous polyamide separator 39. The fluid pressure of the oxygen-rich organic liquid circulated through the mats 2 is adjusted to the pressure of the electrolyte, for better stability of the system.

To activate the battery, a zinc slurry, comprising 49.5 wt % zinc powder (50–500 micron diameter particles amalgamated with 4% mercury), 50 wt % as potassium hydroxide solution of specific gravity 1.4, and 0.5 wt % of gelling agent (polyacrylic acid), was poured into the space 41 between the separator 39 and the nickel foil in each cell so as to cover the nickel mat and separator. Approximately 30 cc of slurry containing about 30 g zinc was introduced into each cell, and following wet-in, the air pump and peristaltic pump were switched on. The open current voltage of the battery was about 4.35 V, with approximately equal voltages of 1.45 V/cell indicating that the system was free from short circuits. The system was then discharged at a current of 21.5 A (30 mA/cm$^2$ at the air electrode) and ran for 10 hours until a 3 V cut-off voltage providing an average discharge voltage of 3.6 V (1.2 V/cell). The battery thus delivered 15 Ah at 3.6 V (54 Wh), and since the total weight of the battery was 400 grams (see weight breakdown and dimensions in Table 2), the energy density was 120 Wh/kg (160 Wh/liter) at this (10-hour) discharge rate, with zinc utilization about 60%.

The reaction of the battery could be represented by the following formulas:

at the cathode: $\frac{1}{2} O_2 + H_2O + 2e \rightarrow 2OH^-$ at the anode: $Zn + OH^- \rightarrow ZnO + H_2O + 2e$ total reaction: $Zn + \frac{1}{2} O_2 \rightarrow ZnO$ The battery had excellent power characteristics, and even after 5 hours discharge, it could still deliver a peak power of 10 A at 2.7 V (200 mA/cm$^2$ peak current at the air electrodes). Following complete discharge, the spent slurry was rinsed out with alkali and a fresh portion of slurry poured into the cells. A discharge performance similar to that of the first cycle was obtained. The compact and robust structure of this bipolar zinc-air battery was noted.

TABLE 2

| Weight Breakdown in gm for 3 Cell Bipolar Zinc-Air Battery (3.6 V, 15 Ah)-Dimensions approx. 110 × 105 × 19 mm. | |
|---|---|
| Zinc slurry | 180 |
| Nickel Foil and Mats | 30 |

TABLE 2-continued

| Weight Breakdown in gm for 3 Cell Bipolar Zinc-Air Battery (3.6 V, 15 Ah)-Dimensions approx. 110 × 105 × 19 mm. | |
|---|---|
| Air electrode Blocking and Active Layers | 5 |
| Plastic Housing | 60 |
| Glue and Separators | 25 |
| Organic Fluid | 100 |
| | 400 |

EXAMPLE 5

A bipolar battery was constructed as in Example 4, but a nickel foam of similar dimensions and porosity to the nickel mat was used as a matrix for the air electrode active and blocking layers in the bipolar air electrode, in place of the nickel mat. The bipolar battery with the foam matrix air electrode performed substantially as in Example 4.

EXAMPLE 6

Figure 7:
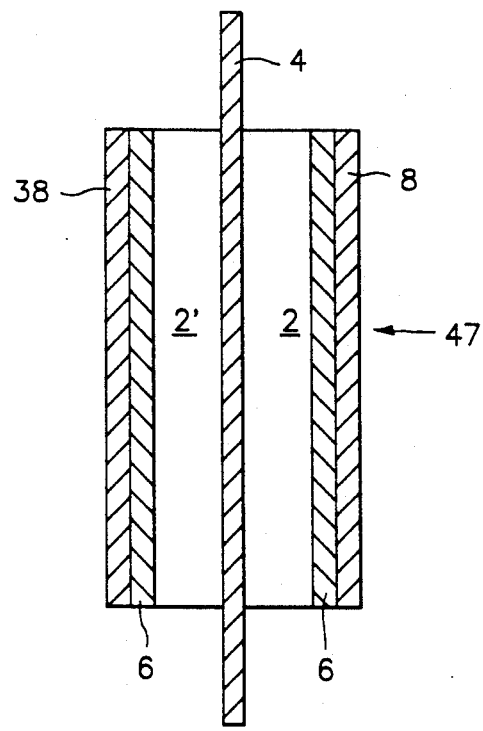
FIG. 7 is a cross-sectional view of a preferred bipolar electrode for use in a hydrogen-oxygen fuel cell of the present invention.

Referring now to FIG. 7, there is shown in cross section a basic bipolar element 47 for a fuel cell comprised of a nickel foil 4 as in Example 3, but with a nickel fiber mat 2,2' of the type and dimensions of Example 3 welded to both sides. For each bipolar element 47, the mat 2 on one side was made catalytic for oxygen reduction by impregnation with a silver-based active layer 8 and an inner blocking layer 6, as described in Example 3. The mat 2' on the other side was made catalytic for hydrogen oxidation by impregnating it with an active layer 38 of platinum catalyzed carbon (5 wt %).

Figure 8:
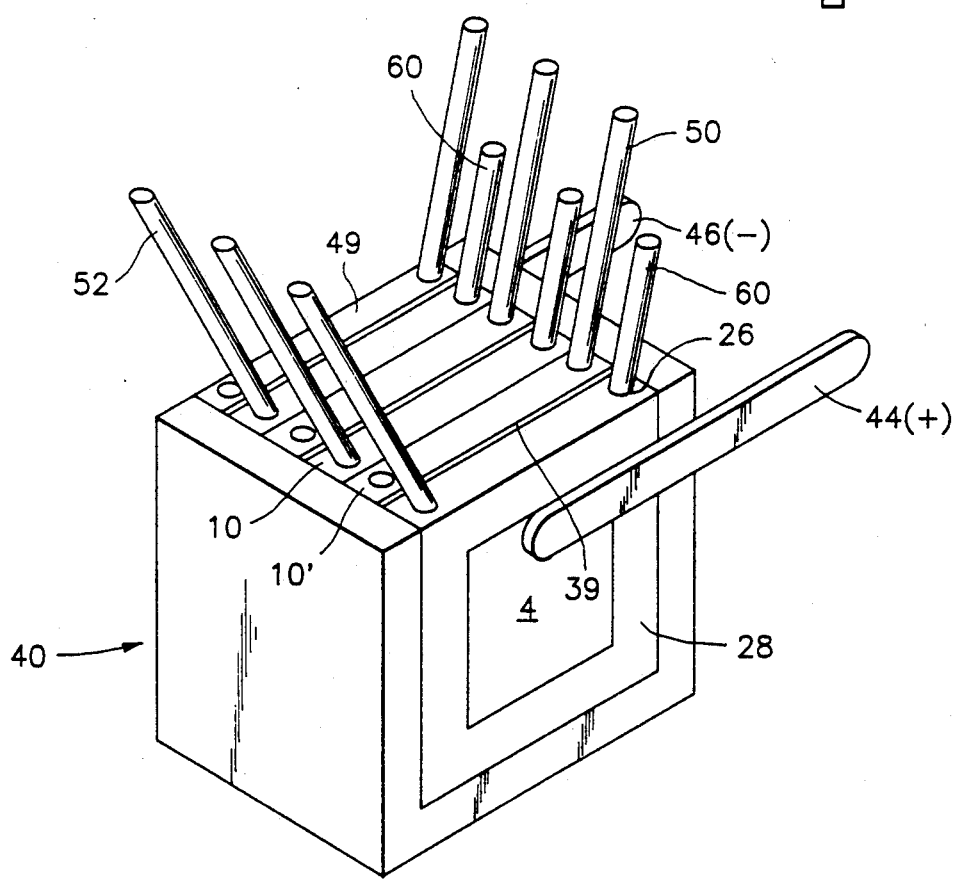
FIG. 8 is a perspective view of an assembled bipolar hydrogen-oxygen fuel cell battery.

Bipolar elements 47 as shown in FIG. 7 are then glued to a pair of mounting plates 10, 10', as shown in FIG. 4, to form the central electrodes for a bipolar hydrogen oxygen fuel cell battery 40, as shown in FIG. 8.

A three-cell bipolar battery 40 was constructed as shown in FIG. 8, with two such central electrodes and two endplates 28 and 49, which endplates in fact function as monopolar electrodes.

The first mounted endplate 28 was tabbed externally with a welded-on piece of nickel foil 44 of dimensions 100 mm × 10 mm × 0.2 mm attached to nickel foil 4 which in turn was attached to an inner mat only (not seen) which is catalytic to oxygen reduction and which formed the positive terminal of the battery.

The other endplate 49 was tabbed externally with a welded-on piece of nickel foil 46 attached to a nickel foil (not shown) and carrying one inner mat catalytic to hydrogen oxidation and serving as the negative terminal of the battery.

In each cell the negative hydrogen electrode mat 2', as shown in FIG. 7, faced the positive oxygen electrode mat 2. The separation between the mats, approximately 1 mm, was filled using a porous polyamide separator 39. The PVC sheets enclosing the respective mat surfaces allowed supply of bottled hydrogen to the negatives, and oxygen-rich organic fluid to the positives via hydrogen supply tubes 50 and oxygen supply tubes 52, respectively.

As in Example 4, oxygen was supplied in dissolved form via perfluorodecalin fluid 136. A 50 ml portion of fluid was maintained saturated with oxygen by continuous bubbling through of air from an aquarium pump. The oxygen-rich fluid was then circulated through the oxygen-reducing mat 2 of the oxygen-hydrogen fuel cell battery, using a peristaltic pump (not shown), at a rate of 10 cc/min, via inlet hoses 52 attached to inlet manifold 22 for delivering oxygen-rich electrolyte immiscible fluid to said mat from a reservoir, as shown in FIG. 2, and then returned for resaturation with oxygen in said reservoir via outlet hoses 60 attached to outlet manifold 26.

The battery was activated by wetting in the separators with potassium hydroxide solution of a specific gravity of 1.3, and supplying oxygen and hydrogen to the respective electrodes. The open circuit voltage of the battery was 3.15 V (1.05 V/cell). A current of 10 A (200 mA/cm$^2$) could be drawn at a potential of 2.4 V, showing the good power delivery of this fuel cell battery.

It will be evident to those skilled in the art that the invention is not limited to the details of the foregoing illustrated embodiments, and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An air cathode in combination with an oxygen-rich electrolyte-immiscible organic fluid for supplying oxygen thereto.

2. An air cathode according to claim 1, wherein said fluid is selected from the group consisting of perfluorocarbons, silicone oils, mineral oils, hydrocarbons and fluorinated hydrocarbons having an ability to carry at least 15 ml oxygen per 100 ml fluid.

3. An air cathode according to claim 1, wherein said fluid is a perfluorocarbon.

4. An air cathode according to claim 3, wherein said perfluorocarbon compound is selected from cis-perfluorodecalin, trans-perfluorodecalin, perfluoro-1-methyl decalin, perfluorotripropylamine, perfluorotributylamine and perfluoroperhydrophenanthrene.

5. An air cathode as claimed in claim 1, in combination with means for pumping said fluid to said cathode.

6. An air cathode as claimed in claim 1, in combination with a reservoir for said fluid in fluid communication with first pumping means for delivering oxygen-rich electrolyte-immiscible fluid to said cathode and returning oxygen-depleted fluid to said reservoir and second pumping means for delivering oxygen to said reservoir for the regeneration of said oxygen-rich fluid.

7. A metal/air battery comprising an air cathode in combination with an oxygen-rich electrolyte-immiscible organic fluid for supplying oxygen thereto.

8. A bipolar primary metal/air battery of the type having a plurality of electrically series-connected cells, each of said cells comprising an air cathode in combination with an oxygen-rich electrolyte-immiscible organic fluid for supplying oxygen thereto.

9. A bipolar electrode for use in a primary metal/air battery of the type having a metallic slurry anode, said electrode comprising:
   a) a current-collecting electrolyte-impervious metallic structure having a first surface for collecting current from said metallic slurry anode;
   b) a metallic foamed or fiber mat having a first surface attached to a second surface of said structure, a second surface of said mat being impregnated with an inner hydrophobic waterproof barrier layer coated with a outer active catalytic layer, said mat constituting an air cathode, and
   c) means for pumping oxygen-rich electrolyte-immiscible organic fluid through said mat.

10. A monopolar primary metal/air battery comprising an air cathode in combination with an oxygen-rich electrolyte-immiscible organic fluid for supplying oxygen thereto.

11. A hydrogen-oxygen fuel cell comprising an air cathode in combination with an oxygen-rich electrolyte-immiscible organic fluid for supplying oxygen thereto.

12. A bipolar electrode for use in a primary fuel cell battery, comprising:
   a) a current-collecting electrolyte-impervious metallic structure;
   b) a first mat of nickel foam, nickel fibers or nickel-coated fibers having a first surface attached to a first surface of said structure, a second surface of said mat being impregnated with an inner hydrophobic waterproof barrier layer coated with an outer active catalytic layer, catalytic for oxygen reduction, said mat constituting a cathode;
   c) a second mat of nickel foam, nickel fibers or nickel-coated fibers having a first surface attached to a second surface of said structure, a second surface of said mat being impregnated with an inner hydrophobic waterproof barrier layer coated with an outer active catalytic layer, catalytic for hydrogen oxidation, said mat constituting an anode;
   d) means for pumping oxygen-rich electrolyte-immiscible organic fluid through said first mat, and
   e) means for pumping hydrogen through said second mat.

* * * * *